Patented May 28, 1940

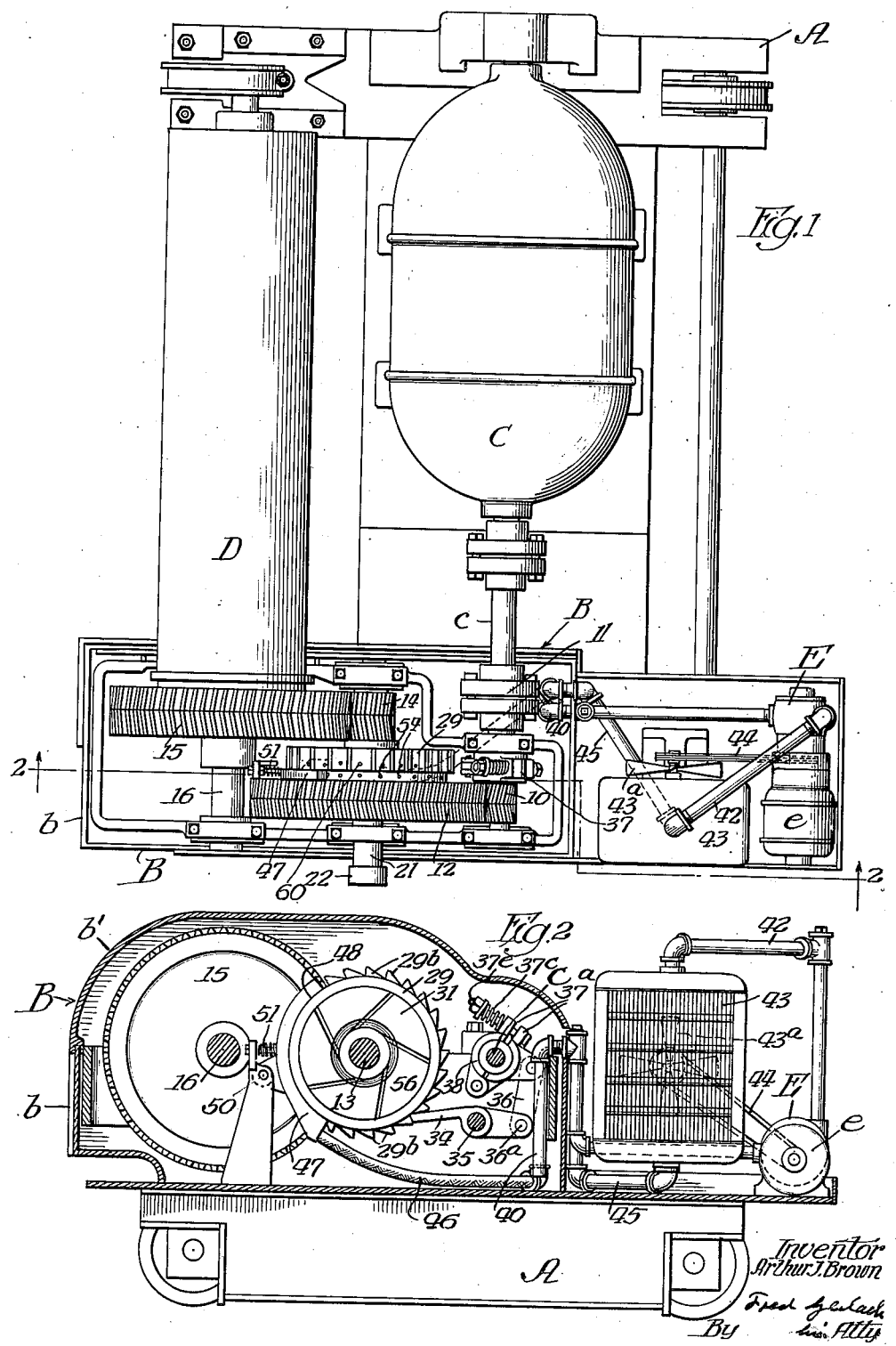

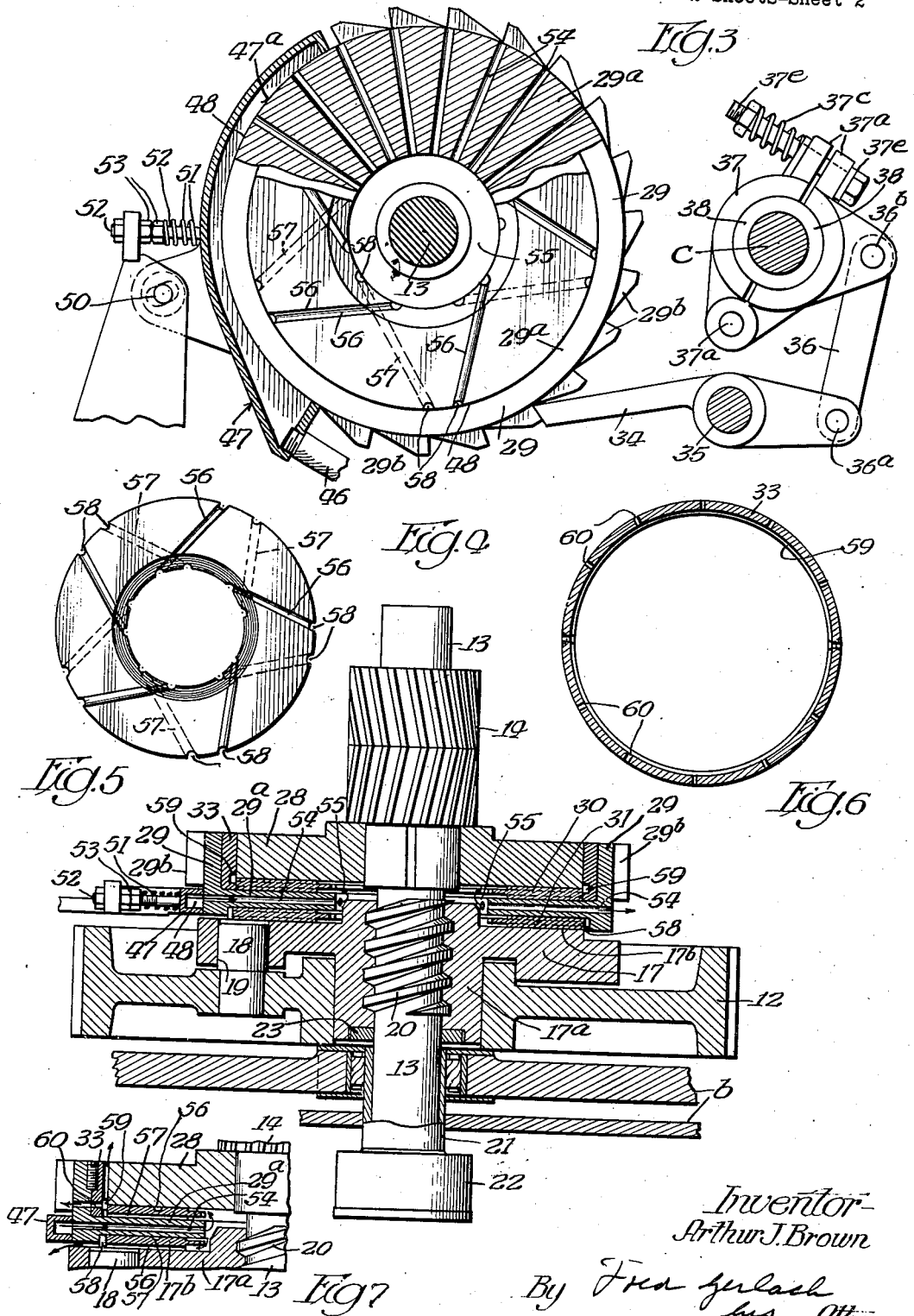

2,202,137

UNITED STATES PATENT OFFICE 2,202,137

MECHANICAL LOAD BRAKE

Arthur J. Brown, Chicago, Ill., assignor to Whiting Corporation, Harvey, Ill., a corporation of Illinois Application October 31, 1938, Serial No. 237,858

11 Claims. (Cl. 188—264)

The invention relates generally to mechanical load brakes.

In load brakes of the friction disk type, such as are used in hoisting mechanisms, it has been found that the friction to which the brake elements are subjected causes them to become excessively heated through failure of the lubricant to circulate at a sufficient rate across and between the coacting faces of the elements, particularly if the brake is used continuously for an extended period.

The primary object of the invention is to provide improved and efficient means for causing the lubricant to circulate between the friction faces and coacting brake elements at a sufficient rate, and under sufficient pressure, to keep the brake elements cool and prevent excessive heating during continuous use of the brake for a considerable period of time and during high speed operation.

This object is obtained primarily by providing means for forcing oil under pressure from the periphery of, and through, one of the brake members to the coacting friction surfaces, as well as between their friction faces.

Another object of the invention is to provide for cooling the oil which is circulated through the brake.

Another object of the invention is to improve the construction and operation of the load brake set forth in Letters Patent of the United States No. 1,868,792, dated July 26, 1932.

Other objects of the invention will appear from the detail description.

The invention consists in the several novel features which are hereinafter set forth, and are more particularly defined by claims at the conclusion hereof.

In the drawings: Fig. 1 is a plan of a hoisting mechanism embodying the invention. Fig. 2 is a section taken on line 2—2 of Fig. 1. Fig. 3 is a view partly in section and partly in elevation of the brake mechanism. Fig. 4 is a section on line 4—4 of Fig. 3. Fig. 5 is a detail of one of the brake disks. Fig. 6 is a section through the bushing in the ratchet member of the brake. Fig 7 is a diagrammatic section through the brake members and the friction disks.

The invention is exemplified in connection with hoisting mechanism comprising a frame A of a trolley which is usually mounted to run on overhead rails; a gear case B adapted to contain oil, mounted on the truck frame A and comprising a bottom section $b$ and a removable cover section $b^1$; a shaft $c$ which is driven by an electric reversible motor C; and a hoisting drum D for operating a hoisting cable to lift and lower a load, as well understood in the art. The drive shaft $c$ is adapted to drive the hoisting drum D through speed-reducing gearing comprising a pinion 10 which is connected to be driven by shaft $c$ through a flexible coupling 11; a gear 12 which meshes with pinion 10 and is connected to drive a counter-shaft 13; a pinion 14 fixed to said counter-shaft; a gear 15 meshing with pinion 14; and a shaft 16 to which gear 15 is secured for driving the drum D. This gearing is suitably mounted in bearings in the gear case B. Gear 12 is connected to drive shaft 13 through a brake member 17. Studs 18 fixed in gear 12 extend through holes 19 in brake member 17 and are secured in gear 12 to drive the brake member 17. Member 17 is axially slidable on studs 18 to permit axial movement of said member. The hub 17ª of member 17 is threaded to a worm or screw 20 formed on shaft 13 by which said member will be operated axially to coact with a complementary brake member 28. Gear 12 is held against axial movement by the interlock between the herringbone gear teeth of pinion 10 and gear 12 while member 17 is free to move axially. Gear 12 is fitted around the hub 17ª of brake member 17. Shaft 13 is suitably held against axial movement and carries a thrust sleeve 21 which fits around shaft 13 and is extended to be engaged by an adjustable stop collar 22. Sleeve 21 is engaged by a thrust collar 23 in the outer end of the hub 17ª of member 17 to limit the axial movement of member 17 in one direction when the mechanism is idle.

Complementary brake member 28 is fixedly secured to shaft 13. An axially movable brake wheel 29 is disposed between brake members 17, 28, and comprises a body or web 29ª having friction faces on its sides. A friction disk 30 is disposed between one of the side faces of the body 29ª of brake member 29 and the contiguous face of brake member 28. A friction disk 31 is seated against the opposite face of body 29ª of wheel 29 and is adapted to be engaged by the face 17ᵇ of brake member 17. A bushing or ring 33, usually of bronze, is fixed in the rim of brake wheel 29 and provides a bearing for brake wheel 29. Brake wheel 29 is provided with ratchet teeth 29ᵇ which are adapted to be engaged by a dog 34 to secure said wheel against rotation in one direction when the brake is to be applied to resist the lowering of the load on drum D. This dog is fulcrumed on a pivot 35 and is automatically shifted into and out of operation with the ratchet, so that while the load is being lifted by rotation of the drum D in one direction, the dog will be disengaged from the ratchet and will engage the ratchet when the load is being lowered. Dog 34 is controlled by a link 36 which is pivoted to the dog at 36ª and at 36ᵇ to a friction collar 37 which is mounted on a bushing 38 which is fixed to rotate with shaft c. Collar 37 comprises sections which are pivoted together at 37ª and which are pressed against bushing 38 by a spring 37ᶜ which is coiled around a bolt 37ᵉ. This collar frictionally grips bushing 38 so the dog 34 will be automatically disengaged from brake-wheel 29 when the drum is being operated in load-lifting direction and to automatically shift the dog into engagement with the teeth 29ᵇ of wheel 29 when the direction of rotation of shaft c is reversed to lower the load.

When a load is being lifted the drum will be driven through pinion 10, gear 12, studs 18, brake member 17, shaft 13 and pinion 14, at which time the member 17 will rotate in that direction which will cause the worm 20 to force it toward brake member 28 so that the brake wheel 29 and disks 30, 31 will be clamped between members 17 and 28. At such time brake wheel 29 is disengaged from dog 34 and free to revolve. As a result member 28 will be driven from member 17.

When the direction of the gearing is reversed in lowering the load, the direction of rotation of gear 12 will be reversed, usually by the reversal of motor C, and collar 37 will be frictionally shifted to throw dog 34 into engagement with the teeth 29ᵇ of brake wheel 29. In lowering, the load will rotate shaft 13 faster than the gear 12 and brake member 17 which is being driven by the motor and, as a result, worm 20 will force member 17 towards brake member 28 which is then locked against rotation, and cause brake wheel 29 and friction disks 30, 31 to be frictionally gripped between members 17 and 28 to retard the rotation of the hoisting drum and the lowering of the load.

In practice it has been found that when the load brake is used in high speed mechanism or for heavy work for an extended period the brake members become over-heated even though oil is circulated across the friction faces of the brake-members and brake wheel and the invention provides means for positively forcing oil under pressure through the brake wheel to the coacting faces of the brake members, to more efficiently cool the parts.

A supply of oil is maintained on the bottom of the gear case B and a gear pump E is provided for circulating the oil under pressure. Pump E is driven by an electric motor e which is mounted on the trolley frame A. A pipe 40 leads from the pool of oil in the gear case to the inlet side of the oil pump. A pipe 42 leads from the outlet side of the pump to a radiator 43 through which the oil from the pump passes so that it will be cooled in transit to the brake mechanism. A fan 43ª driven from the motor e by a belt 44 forces air through the radiator to cool the oil flowing therethrough. From the radiator the oil passes through a pipe 45 to a flexible pipe section 46 in gear case B. Pipe section 46 delivers the oil to a segmental shoe 47. Brake wheel 29 is provided with an outer peripheral face 48 which is engaged by the shoe. The shoe is pivotally supported at 50 and a spring 51 around a stem 52 on the shoe presses the shoe against the face 48 of brake wheel 29. Nuts 53 are provided for adjusting and limiting the pressure of the shoe against said periphery. The shoe is provided with a chamber 47ª for delivering oil to said peripheral face. The brake wheel 29 is provided with a series of radial ports 54 through which oil from the shoe 47ª is forced to conduct oil into the space 55 between brake members 28 and 17 inwardly of disks 30, 31. The outer faces of each of the friction disks 30, 31 have formed therein tangential grooves 56 to conduct oil across the contiguous faces of the disks and the brake members 28 and 17, respectively. The inner faces of the disks 30, 31 are also provided with tangential grooves 57 for conducting oil from chamber 55 to the engaging faces between brake wheel 29 and the disks, respectively. Each of the disks is provided with peripheral grooves 58 at the outer ends of grooves 56, 57. Bushing 33 is provided with an annular groove 59 which communicates with the grooves 56 of disk 30. Radial holes 60 extend through bushing 33 and the rim of brake wheel 29 for the escape of the oil between brake wheel 29 and brake member 28 to the gear case. The oil from grooves 56 and 57 in disk 31 escapes through peripheral grooves 58 to the clearance between brake wheel 29 and brake member 17 to the gear case.

In the operation of the load brake, the brake wheel 29 and disks 30, 31 will be forced together by the weight of the load through worm 20 and member 17 when the brake wheel is automatically arrested by dog 34, as before described. Oil will be continuously circulated by the pump E from the gear case B through the radiator 43 where it will be cooled and through pipes 45, 46 to the shoe 47. The oil from the shoe will be forced inwardly through the ports 54 in the brake wheel 29 which are in communication with the shoe, to the chamber 55. From said chamber the oil will be forced through grooves 56, 57 in the faces of the disks 30, 31 to cool the friction surfaces between the disks and brake members 17 and 28 and brake wheel 29. The oil from the grooves in the faces of disks 30 will flow to groove 59 and be discharged through port 60 into the gear case. The oil from the grooves in disk 31 will be discharged through grooves 58 at their outer faces into the gear case.

The oil flowing through the ports 54 which are not in registry with the shoe 47, will conduct oil through the brake wheel outwardly back to the gear case and aid in cooling the brake wheel. Sufficient volume of oil is supplied from the pump to maintain a constant circulation of oil through the grooves in the disks 30, 31 and the ports 54.

The invention exemplifies a mechanical load brake equipped with means for continuously circulating oil under pressure to cool the brake members so that even during the operation of the brake for an extended period the parts will not become overheated. It also exemplifies, in connection with such circulation means, a cooler for the oil which contributes to the efficiency of the circulating means for cooling the parts.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The combination with a pair of coacting rotary brake-members provided with friction-faces, one of said members being provided with ports and with an exposed outer face with which said ports communicate, of means for forcing oil under pressure from said exposed outer face through said ports for cooling said latter member.

2. The combination with a pair of coacting brake-members provided with friction-faces having grooves therein, one of said members being provided with ports extending therethrough and with an exposed outer face communicating with said ports, of means for forcing oil under pressure from said exposed outer face through said ports and to and through said grooves for cooling said members.

3. The combination with a pair of rotary coacting brake-members provided with friction-faces, one of said members being provided with ports extending therethrough, a stationary shoe for delivering oil under pressure to said ports, and means for conducting the oil from said shoe to and across the friction-faces for cooling said members.

4. The combination with a pair of rotary coacting brake-members provided with friction-faces, one of said members being provided with ports extending therethrough, of a stationary shoe for delivering oil under pressure to said latter member, means for conducting oil to said ports so the oil will pass through the member provided therewith, and means for forcing oil through the shoe to and through said ports.

5. The combination with a pair of rotary opposed brake-members and a brake-wheel between the members, means for holding said wheel against rotation, the wheel being provided with a peripheral face, of means for forcing oil under pressure from the peripheral face of, and radially through, said brake-wheel for cooling said wheel.

6. The combination with a pair of rotary opposed brake members and a brake-wheel between the members, means for holding said wheel against rotation, the wheel being provided with a cylindrical peripheral face, of means for forcing oil under pressure to the peripheral face and radially through said brake-wheel, and means for conducting some of the oil which is passed through said wheel to and across the friction-faces and some of the oil outwardly through said wheel, for cooling said members and wheel.

7. The combination with a pair of rotary opposed brake-members and a brake-wheel between the members, means for holding said wheel against rotation, the wheel being provided with an outer peripheral face, of a stationary shoe for delivering oil under pressure to and engaging said wheel, and means for conducting oil from the shoe through said brake-wheel and to and across the friction-faces for cooling said members and wheel.

8. The combination with a pair of rotary opposed brake-members and a brake-wheel between the members, means for holding said wheel against rotation, the wheel being provided with an outer peripheral face and a series of ports extending inwardly from the peripheral face and through the wheel, of a segmental shoe for conducting oil under pressure to a portion of the peripheral face, and means for conducting some of the oil which has passed radially through the brake-wheel, to and across the friction-faces, for cooling said members and wheel, the ports in the wheel which are not covered by the shoe being adapted to discharge oil outwardly through the wheel.

9. The combination with a pair of opposed brake members, a brake wheel between said members, provided with an outer peripheral face and through ports leading inwardly from said face, friction disks between said members and said wheel, provided with grooves across their faces, of means for forcing oil under pressure to the peripheral face and inwardly through said ports and through the grooves in the disks, for cooling the members and the wheel.

10. The combination with a pair of opposed brake members, a brake wheel between said members, provided with an outer peripheral face and a series of ports extending upwardly from said face, friction disks between said members and said wheel, provided with grooves across their faces, of means comprising a segmental shoe engaging said peripheral face, for delivering oil under pressure to some of said ports, and means for conducting oil from the ports to the grooves in the disks, for cooling the members and the wheel, and to the ports which are out of communication with the shoe, for discharge through the brake wheel.

11. The combination with a mechanical load brake comprising a pair of coacting brake members, a brake wheel provided with an outer peripheral face and through ports leading inwardly from the peripheral face, said members and wheel being provided with friction faces, and a case around the brake, adapted to contain lubricant, of means for conducting oil from said ports across the friction faces, and means for circulating oil through said conducting means, the ports in the wheel and the case, comprising a power-driven oil pump, and means for cooling the oil being circulated by the pump.

ARTHUR J. BROWN.